(12) United States Patent
Chen

(10) Patent No.: US 9,874,948 B2
(45) Date of Patent: Jan. 23, 2018

(54) MOUSE DEVICE WITH MOVABLE SIGNAL INPUT MODULE

(71) Applicant: DEXIN CORPORATION, New Taipei (TW)

(72) Inventor: Yi-Shun Chen, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/130,714

(22) Filed: Apr. 15, 2016

(65) Prior Publication Data

US 2017/0300137 A1    Oct. 19, 2017

(51) Int. Cl.
*G06F 3/033* (2013.01)
*G06F 3/0354* (2013.01)

(52) U.S. Cl.
CPC ................ *G06F 3/03543* (2013.01)

(58) Field of Classification Search
CPC .................................. G06F 3/03543
USPC ......................................... 345/163
See application file for complete search history.

(56) References Cited

U.S. PATENT DOCUMENTS

| | | | |
|---|---|---|---|
| 2002/0054023 A1* | 5/2002 | Adan | G06F 3/0312 345/163 |
| 2002/0158844 A1* | 10/2002 | McLoone | G06F 3/0213 345/163 |
| 2005/0248533 A1* | 11/2005 | Chu | G06F 3/0383 345/163 |
| 2006/0007151 A1* | 1/2006 | Ram | G06F 3/03543 345/163 |
| 2007/0052676 A1* | 3/2007 | Dai | G06F 3/03543 345/163 |

* cited by examiner

*Primary Examiner* — Roy Rabindranath
(74) *Attorney, Agent, or Firm* — Li & Cai Intellectual Property (USA) Office

(57) ABSTRACT

A mouse device with a movable signal input module includes a housing, a control module, and a signal input module. The signal input module is movably disposed in the housing and coupled to the control module. The signal input module includes a roller partially protruding from the housing. The signal input module is linearly movable relative to the housing along a travelling direction to allow the roller to in sync linearly move relative to the housing along the travelling direction.

8 Claims, 5 Drawing Sheets

US 9,874,948 B2

MOUSE DEVICE WITH MOVABLE SIGNAL INPUT MODULE

BACKGROUND OF THE INVENTION

1. Field of the Invention

The present invention relates to a mouse device, and more particularly to a mouse device with a movable signal input module.

2. Description of Related Art

As technology advances, personal computers, laptops or tablets in all shapes and sizes have become an essential tool for both work and entertainment. The computer mouse is a common input device for electronic instruments.

However, the conventional mouse has a predetermined specification at time of manufacture and does not always meet each individual's specific needs. For example, a user who has a longer index finger may feel uncomfortable under a long duration of a page-rolling operation and wish to adjust the position of the roller, and another user may wish to adjust the click force applied to the switch, depending on personal habits or preferences. The performance of the conventional mouse has, in recent years, been improved, but different users usually have different usage habits in using the conventional mouse.

SUMMARY OF THE INVENTION

The object of the present invention is to provide a mouse device with a movable signal input module capable of being adjusted in its position to meet different needs.

In order to achieve the aforementioned objects, the present invention provides a mouse device with a movable signal input module, which includes a housing, a control module, and a signal input module. The signal input module is movably disposed in the housing and coupled to the control module. The signal input module includes a roller partially protruding from the housing. The signal input module is linearly movable relative to the housing along a travelling direction, allowing the roller to synchronously move forward and backward along the travelling direction.

Therefore, the present invention provides a mouse device with a movable signal input module, in which the roller can be linearly moved to meet different needs due to the design of the signal input module including a roller partially protruding from the housing and being linearly movable relative to the housing along a travelling direction to allow the roller to synchronously move forward and backward along the travelling direction.

To further understand the techniques, means and effects of the present invention applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the present invention.

DETAILED DESCRIPTION OF THE PREFERRED EMBODIMENTS

The embodiments of a mouse with a movable signal input module of the present invention are described. Other advantages and objectives of the present invention can be easily understood by one skilled in the art from the disclosure. The present invention can be applied in different embodiments. Various modifications and variations can be made to various details in the description for different applications without departing from the scope of the present invention. The drawings of the present invention are provided only for simple illustrations, but are not drawn to scale and do not reflect the actual relative dimensions. The following embodiments are provided to describe in detail the concept of the present invention, and are not intended to limit the scope thereof in any way.

Figure 1:
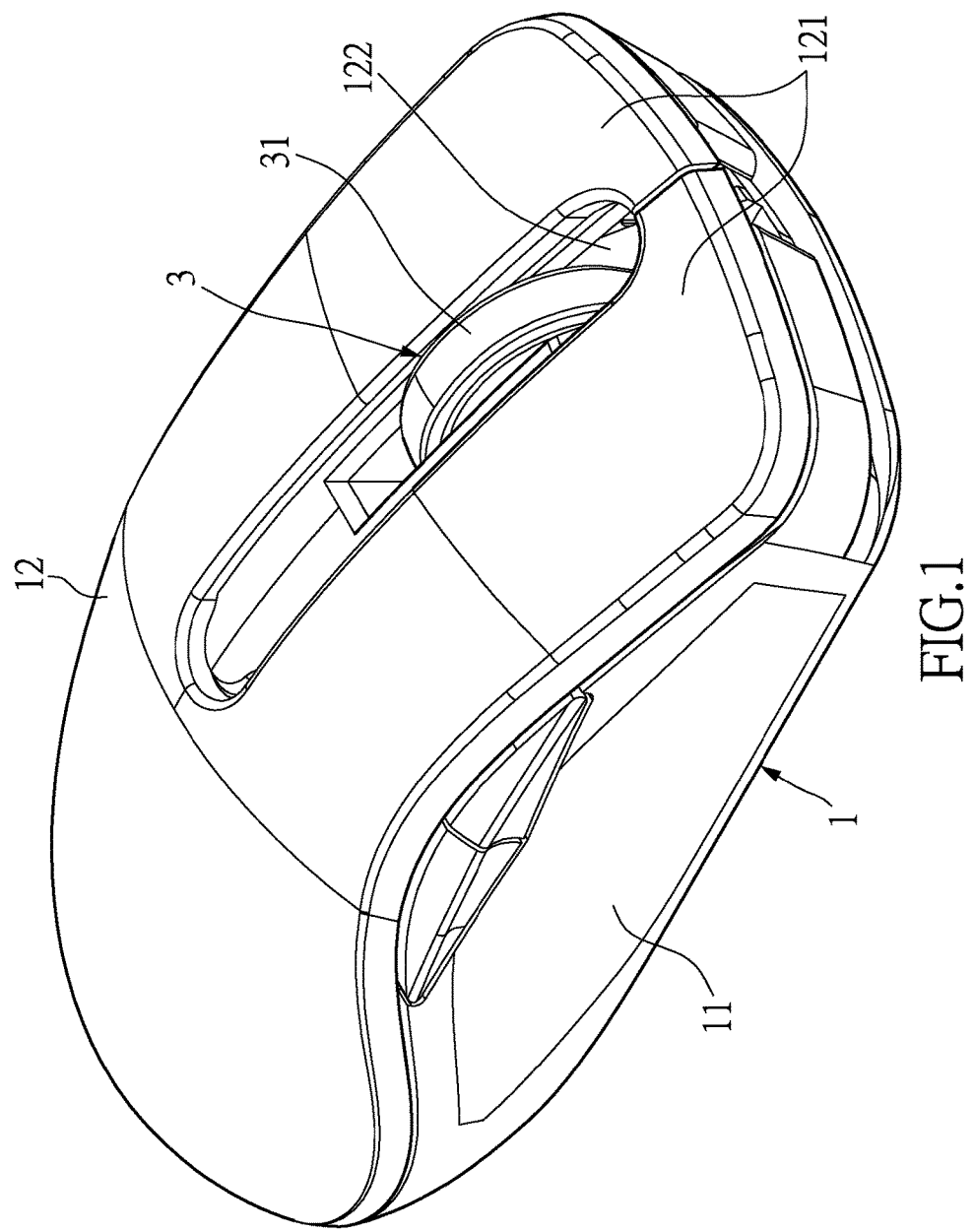
FIG. 1 is a perspective view of a mouse device according to one embodiment of the present invention.
Figure 2:
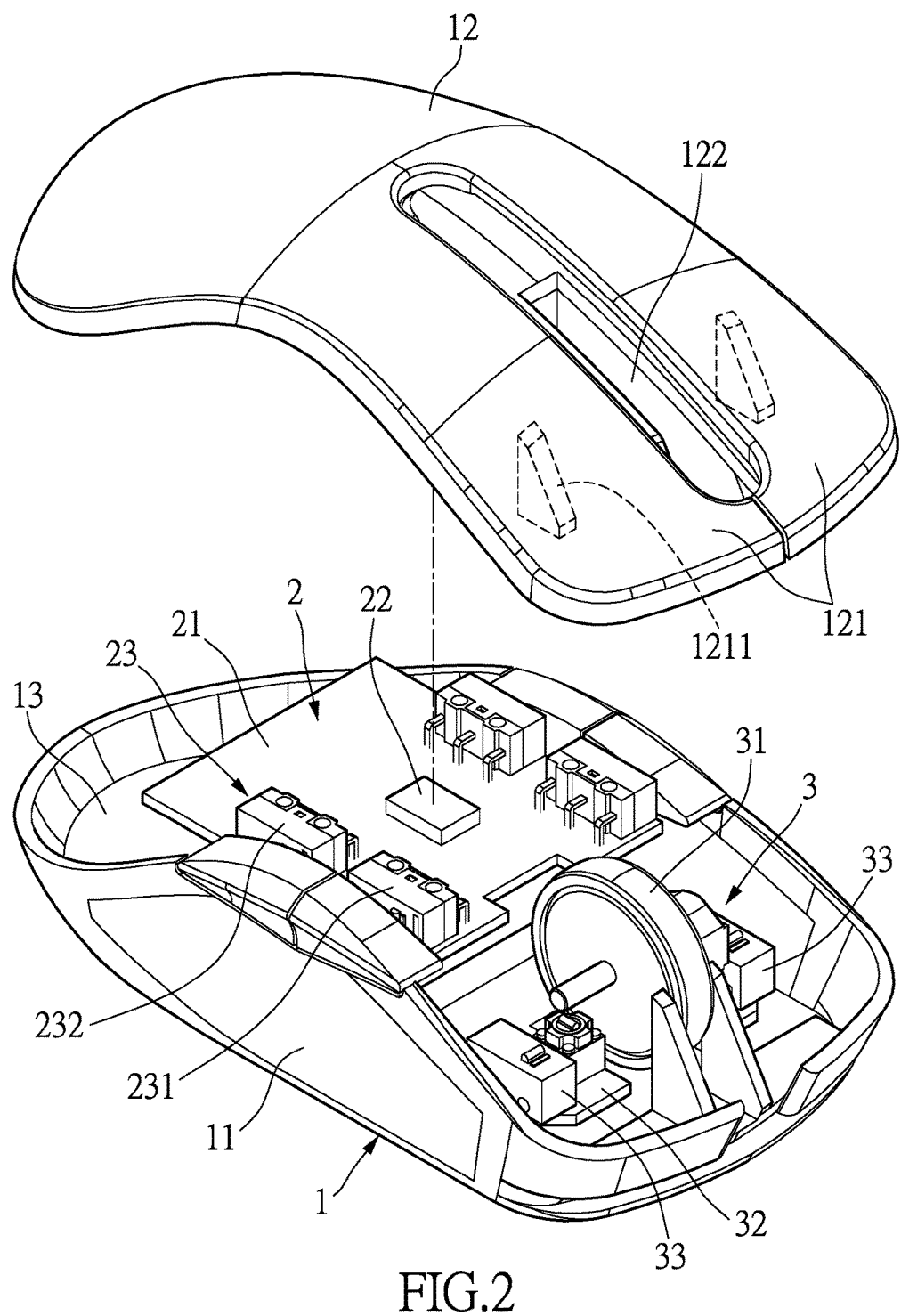
FIG. 2 is a partial, exploded view of a mouse device according to one embodiment of the present invention.

First, referring to FIG. 1 and FIG. 2, one of the embodiments of the present invention provides a mouse device with a movable signal input module, comprising: a housing 1, a control module 2, and a signal input module 3.

The housing 1 includes a base 11 and a cover 12 assembled to the base 11. The base 11 and the cover 12 together form an accommodating space 13 of the housing 1. The fore part of the cover 12 is provided with two adjacent keys 121. An opening 122 is formed between the two keys 121, and two pressing arms 1211 are respectively extended from two inner sides of the two keys 121.

The control module 2 is disposed in the accommodating space 13 of the housing 1 and can be positioned on the base 11. The control module 2 includes a main board 21 and a micro-controller 22 disposed on the main board 21. It is worth noting that the control module 2 may further include other components disposed on the main board 21.

The signal input module 3 is movably disposed in the accommodating space 13 of the housing 1 and coupled to the control module 2.

More particularly, the signal input module 3 includes a roller 31, and the roller 31 partially protrudes from the housing 1 through the opening 122.

In the present embodiment, the signal input module 3 can further include a circuit board 32 and two switches 33 disposed on the circuit board 32. The two switches 33 respectively correspond to the positions of the two pressing arms 1211 of the two keys 121. The two keys 121 can be pressed by fingers to allow the two pressing arms 1211 to press the two switches 33, thereby generating the corresponding operating signals to the control module 2.

More particularly, the roller 31 is operatively disposed on the circuit board 32 and located between the two switches 33. The roller 31 can be driven to rotate, swing left and right, or press downward relative to the circuit board 32 by a user's finger, thereby generating the corresponding operating signals to the control module 2.

Figure 3:
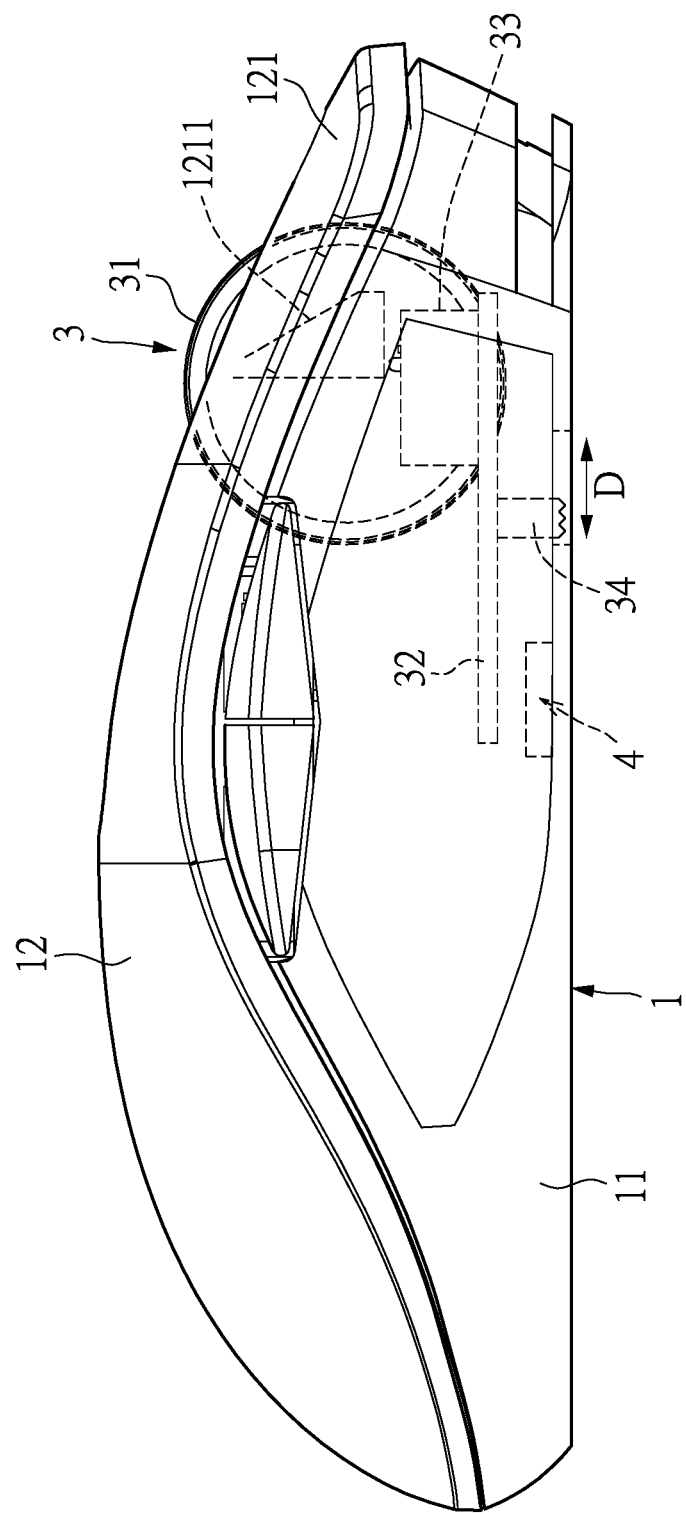
FIG. 3 is a schematic diagram (1) of action of a mouse device according to one embodiment of the present invention.
Figure 4:
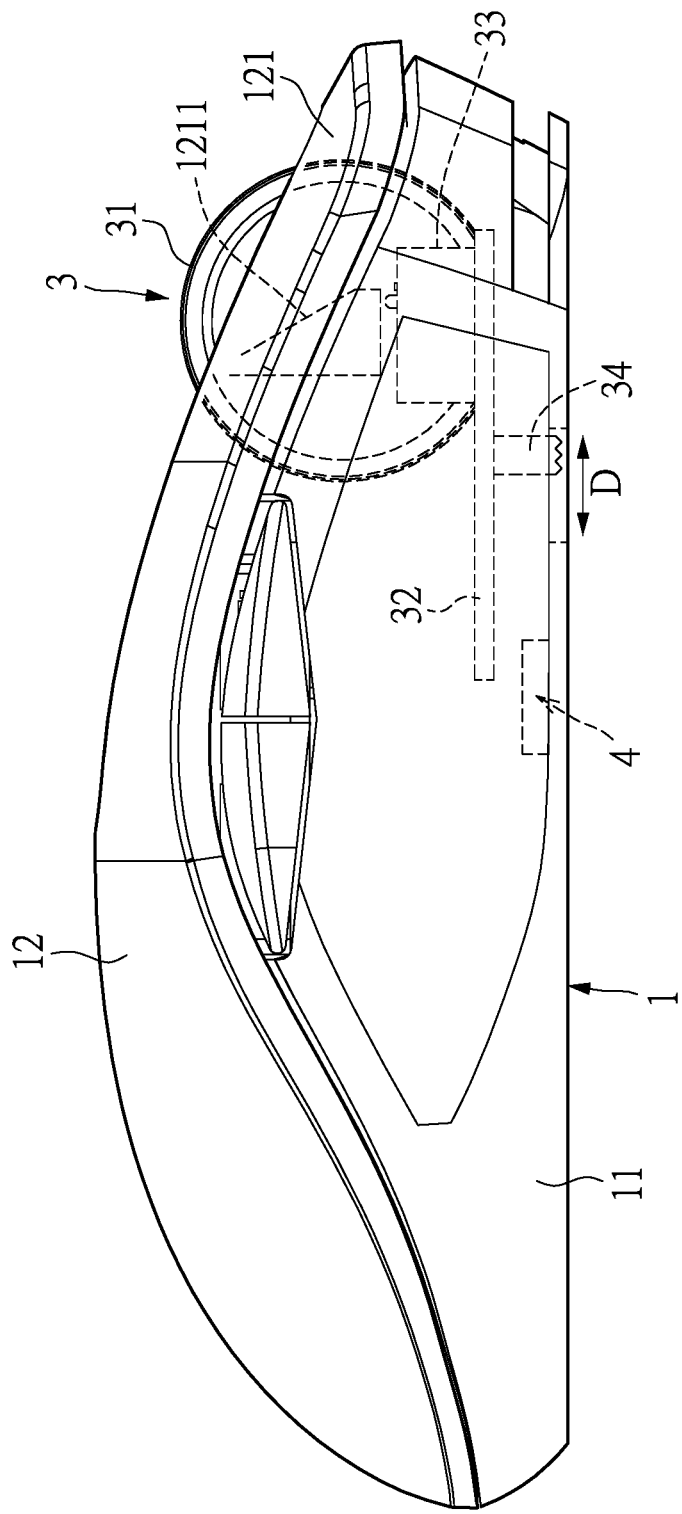
FIG. 4 is a schematic diagram (2) of action of a mouse device according to one embodiment of the present invention.

More particularly, referring to FIG. 3 and FIG. 4, the circuit board 32 is movably disposed in the accommodating space 13 of the housing 1. The circuit board 32 is linearly movable relative to the housing 1 along a travelling direction D. The travelling direction D is a linear direction and can be regarded as a longitudinal direction of the housing 1. When the circuit board 32 is linearly moved relative to the housing 1 along the travelling direction D, the roller 31 is driven in sync to move linearly relative to the housing 1 along the travelling direction D. In addition, the signal input module 3 can further include a push element 34 disposed at the circuit board 32 for pushing the circuit board 32 to move, and the push element 34 can be, but is not limited to, a push button.

Therefore, if a user wishes to adjust the position of the roller 31 during operation, the user can push the push element 34 to drive the circuit board 32 to linearly move forward and backward, such that the position of the roller 31 relative to the housing 1 can be adjusted linearly. Specifically, the roller 31 shown in the FIG. 4 is located closer to the front as compared with the roller 31 shown in FIG. 3, so that the roller 31 is capable of moving forward to satisfy the needs of the user with a longer index finger. Of course, the roller 31 is capable of moving backward to satisfy the needs of the user with a shorter index finger.

More particularly, when the circuit board 32 is linearly moved relative to the housing 1 along the travelling direction D, the two switches 33 disposed on the circuit board 32 are driven to move synchronously for adjusting the positions of the two switches 33 relative to the housing 1, such that the positions of the two switches 33 relative to the two keys 121 of the housing 1 are also adjusted. Specifically, the switch 33 shown in the FIG. 4 is located closer to the front as compared with the switch 33 shown in FIG. 3, so that the switch 33 is capable of moving forward for increasing the length of the force arm under the same torque, and the user can, through the key 121, press the switch 33 with a lighter force. Of course, the switch 33 is capable of moving backward for decreasing the length of the force arm under the same torque, and the user can, through the key 121, press the switch 33 with a harder force. In this way, the user can adjust the click force when clicking the key 121.

Therefore, the signal input module 3 is linearly movable relative to the housing 1 along the travelling direction D to allow the roller 31 and the switches 33 to in sync linearly move relative to the housing 1 along the travelling direction D, for adjusting the positions of the roller 31 and the switches 33, in order to satisfy different needs.

In the present embodiment, the mouse device can further comprise a position detector 4. The position detector 4 is disposed in the accommodating space 13 of the housing 1 and coupled to the control module 2. The position detector 4 is used to detect the position of the circuit board 32 relative to the housing 1 and output a position signal to the control module 2. For example, the position detector 4 can be a hall sensor, a light blocking device, an optoelectronic sensor, or a variable resistance device. In the present embodiment, the position detector 4 is taken as a variable resistance device and will be described below in detail.

The position detector 4 is used to output a resistance value to serve as a position signal to the control module 2 according to the position of the circuit board 32 relative to the housing 1, such that the control module 2 can determine the position of the circuit board 32 relative to the housing 1 according to the position signal. By way of example, when the circuit board 32 is located at the front relative to the housing 1, the position detector 4 may output a larger resistance value. Conversely, when the circuit board 31 is located at the rear relative to the housing 1, the position detector 4 may output a smaller resistance value, and thereby the resistance value can be used as a position signal of the signal input module 3.

In more detail, if a first user has a longer index finger, so that the signal input module 3 is, for example, adjusted and located at the front relative to the housing 1, the position detector 4 outputs a resistance value of about 10 ohms. If a second user has a shorter index finger, so that the signal input module 3 is, for example, adjusted and located at the rear relative to the housing 1, the position detector 4 outputs a resistance value of about 5 ohms. Thus, the control module 2 records the position signal of the signal input module 3 according to the size of resistance value when the first user or the second user operates the mouse device. The control module 2 can have a storage element (not shown) used for storing the position signal of the signal input module 3 when either a first user or a second user operates the mouse device.

In the present embodiment, the control module 2 can further include a setting interface 23. The setting interface 23 is disposed on the main board 21 and operatively coupled to the micro-controller 22. The setting interface 23 is used to generate a setting signal to the micro-controller 22, such that the micro-controller 22 can control the position detector 4 to record the position signal according to the setting signal. The setting interface 23 can have a first setting key 231 and a second setting key 232. When the first user operates the mouse device the first time, the first user adjusts for a most suitable position of operation by means of the signal input module 3. Next, the first user presses the first setting key 231, so as to record the position signal of the signal input module 3 when operating the mouse device. Therefore, when the first user operates the mouse device again, the first user again presses the first setting key 231, and the signal input module 3 can be automatically adjusted to the most suitable position which has been previously set. Likewise, the first setting key 231 and the second setting key 232 can record respectively the position signal of the signal input module 3 when the first user and the second user operate the mouse device, thereby automatically performing the adjustment.

Figure 5:
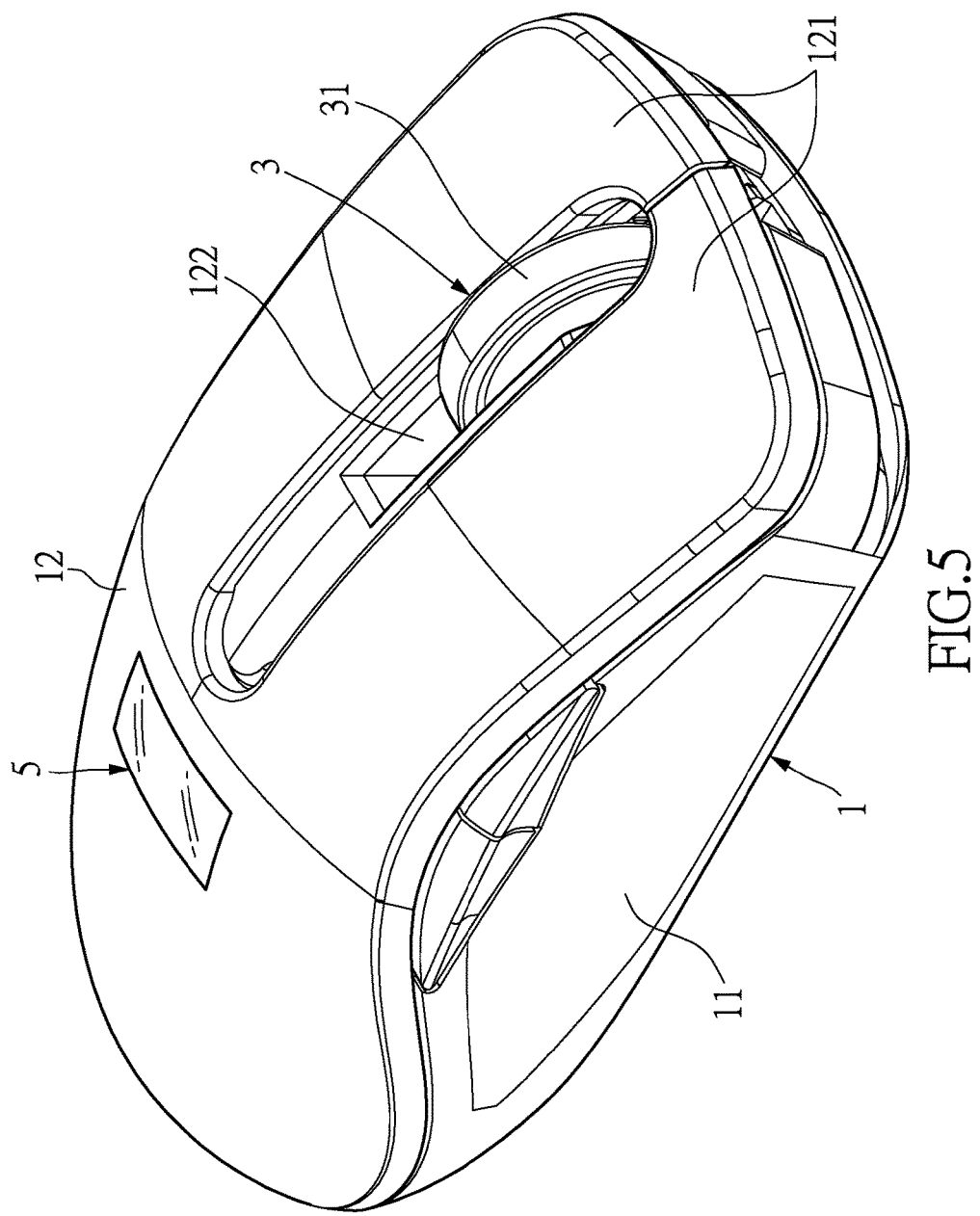
FIG. 5 is a perspective view of a mouse device according to another one embodiment of the present invention.

In another embodiment, as shown in FIG. 5, the mouse device can further comprise a display module 5. The display module 5 is disposed in and partially exposed from the housing 1, and the display module 5 is operatively coupled to the control module 2. The display module 5 can be, but is not limited to, a liquid crystal display, an indicator, or a seven-segment display. In the present embodiment, the display module 5 is, for example, a liquid crystal display. The display module 5 is used to display the position signal indicative of a current position of the signal input module 3 when a user operates the mouse device, thereby informing the user.

In conclusion, the present invention provides a mouse device with a movable signal input module, in which the roller 31 can be linearly moved, for linearly adjusting the position of the roller 31, due to the design of the signal input module 3 including a roller 31 partially protruding from the housing 1 and being linearly movable relative to the housing 1 along a travelling direction D to allow the roller 31 to synchronously move forward and backward along the travelling direction D. Moreover, the roller 31 and the switches 33 can be moved in sync, for linearly adjusting the positions of the roller 31 and the switches 33, due to the design of the roller 31 and the switches 33 being disposed on the circuit board 32, and the circuit board 32 being linearly movable relative to the housing 1 along a travelling direction D to allow the roller 31 and the switches 33 to move in sync relative to the housing 1 along the travelling direction D.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A mouse device with a movable signal input module, comprising:
    a housing, including a base and a cover, wherein the cover is assembled to the base and has two keys adjacent to one another, an opening is formed between the two keys, and two pressing arms are respectively extended from two bottom sides of the two keys;
    a control module, disposed in the housing; and
    a signal input module, movably disposed in the housing, coupled to the control module, including a roller partially protruding from the housing, a circuit board and two switches, wherein the two switches and the roller are disposed on the circuit board, the roller with a rotational axis is located between the two switches and passes through the opening, and the two switches respectively correspond to the two pressing arms;
    wherein the signal input module is longitudinally movable relative to the housing along a travelling direction to allow the roller, the rotational axis of the roller and the two switches to in sync longitudinally move relative to the housing along the travelling direction for longitudinally adjusting positions of the roller and the two switches.

2. The mouse device with a movable signal input module according to claim 1, further comprising:
    a position detector, disposed in the housing and coupled to the control module;
    wherein the position detector is used to detect a position of the circuit board relative to the housing and output a position signal, such that the control unit can determine the position of the circuit board relative to the housing according to the position signal.

3. The mouse device with a movable signal input module according to claim 2, wherein the control module includes a main board, a micro-controller and a setting interface, the micro-controller and the setting interface are electrically connected to each other and respectively disposed on the main board, the setting interface is used to generate a setting signal to the micro-controller, such that the micro-controller can control the position detector to record the position signal according to the setting signal.

4. The mouse device with a movable signal input module according to claim 3, further comprising:
    a display module, disposed in and exposed from the housing and operatively coupled to the control module for displaying the position signal.

5. A mouse device with a movable signal input module, comprising:
    a housing, including a base and a cover, wherein the cover is assembled to the base and has two keys adjacent to one another, an opening is formed between the two keys, and two pressing arms are respectively extended from two bottom sides of the two keys;
    a control module, disposed in the housing; and
    a signal input module, movably disposed in the housing, coupled to the control module, including a roller partially protruding from the housing, a circuit board, two switches and a push button, wherein the two switches and the roller are disposed on the circuit board, the roller with a rotational axis is located between the two switches and passes through the opening, the two switches respectively correspond to the two pressing arms, and the push button is disposed under the circuit board and exposed to a bottom side of the base for driving the circuit board to move forward or backward;
    wherein the signal input module is longitudinally movable relative to the housing along a travelling direction to allow the roller, the rotational axis of the roller and the two switches to in sync longitudinally move relative to the housing along the travelling direction for longitudinally adjusting positions of the roller and the two switches.

6. The mouse device with a movable signal input module according to claim 5, further comprising:
    a position detector, disposed in the housing and coupled to the control module;
    wherein the position detector is used to detect a position of the circuit board relative to the housing and output a position signal, such that the control unit can determine the position of the circuit board relative to the housing according to the position signal.

7. The mouse device with a movable signal input module according to claim 6, wherein the control module includes a main board, a micro-controller and a setting interface, the micro-controller and the setting interface are electrically connected to each other and respectively disposed on the main board, the setting interface is used to generate a setting signal to the micro-controller, such that the micro-controller can control the position detector to record the position signal according to the setting signal.

8. The mouse device with a movable signal input module according to claim 7, further comprising:
    a display module, disposed in and exposed from the housing and operatively coupled to the control module for displaying the position signal.

* * * * *